United States Patent
Sturges et al.

(10) Patent No.: US 9,401,589 B2
(45) Date of Patent: Jul. 26, 2016

(54) CABLE BEND LIMITER

(71) Applicant: Raytheon Company, Waltham, MA (US)

(72) Inventors: James R. Sturges, Tiverton, RI (US); Christopher Blake, Swansea, MA (US)

(73) Assignee: Raytheon Company, Waltham, MA (US)

( * ) Notice: Subject to any disclaimer, the term of this patent is extended or adjusted under 35 U.S.C. 154(b) by 211 days.

(21) Appl. No.: 14/332,011

(22) Filed: Jul. 15, 2014

(65) Prior Publication Data

US 2016/0018029 A1   Jan. 21, 2016

(51) Int. Cl.
*F16L 11/18* (2006.01)
*H02G 3/04* (2006.01)

(52) U.S. Cl.
CPC .................. *H02G 3/0475* (2013.01)

(58) Field of Classification Search
USPC .......................................... 138/110, 119, 120
See application file for complete search history.

(56) References Cited

U.S. PATENT DOCUMENTS

| | | | | |
|---|---|---|---|---|
| 967,901 A * | 8/1910 | Greenfield | ............... | F16L 35/00 138/120 |
| 1,827,432 A * | 10/1931 | Hundemer | ............... | F16L 11/18 138/120 |
| 2,432,278 A * | 12/1947 | Bratz | ........................ | F16C 1/10 138/120 |
| 3,190,286 A * | 6/1965 | Stokes | ............... | A61B 1/00165 138/120 |
| 3,929,164 A * | 12/1975 | Richter | .................. | F16L 11/121 138/103 |
| 4,790,294 A * | 12/1988 | Allred, III | .......... | G02B 23/2476 138/120 |
| 4,796,607 A * | 1/1989 | Allred, III | ............ | A61B 1/0055 138/120 |
| 5,134,251 A * | 7/1992 | Martin | ................. | H02G 3/0475 138/110 |
| 5,254,809 A * | 10/1993 | Martin | .................... | F16L 57/02 138/120 |
| 5,449,206 A * | 9/1995 | Lockwood | .............. | F16L 11/18 138/120 |
| 6,039,081 A | 3/2000 | Albert | | |
| 8,448,669 B2 * | 5/2013 | Wen | ...................... | B60T 11/046 138/119 |
| 8,607,826 B2 | 12/2013 | Krohn et al. | | |
| 2009/0126819 A1 * | 5/2009 | Beesley | .................... | F16L 1/24 138/106 |

OTHER PUBLICATIONS http://seaconworldwide.com/wp-content/uploads/2011/07/SEACON-DS-0001-Universal-Joint-Bend-Restrictor-Rev-2-low-res.pdf, 2011.

* cited by examiner

*Primary Examiner* — James Hook
(74) *Attorney, Agent, or Firm* — Burns & Levinson LLP; Joseph M. Maraia

(57) ABSTRACT

A cable bend limiter provides one or more joints including alternating sleeves and outer ball sections enclosing inner ball sections. Friction is controlled by washers at, or low friction surface treatments on, either side of the outer ball sections.

15 Claims, 8 Drawing Sheets

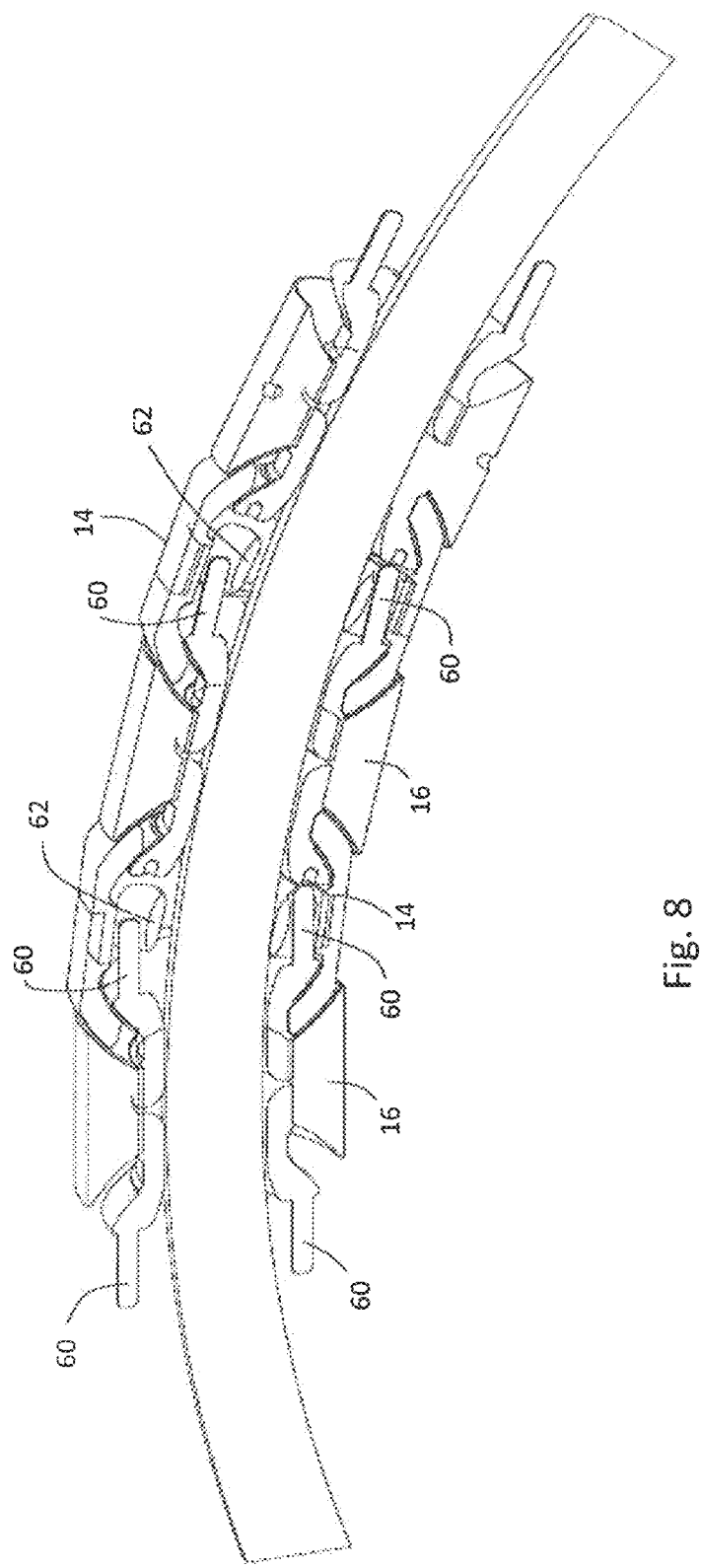

CABLE BEND LIMITER

FIELD OF THE INVENTION

The present invention generally relates to cable bend limiters, and in particular to segmented cable bend limiters.

BACKGROUND OF THE INVENTION

Various types of flexible conduits such as communication cables are used in dynamic applications which can easily cause bending of the conduit. Such bending can be damaging to the conduit and to the function that it serves. It is desirable to limit the bending of communications cables in dynamic applications to maintain cable functionality. Where predetermined locations on a cable are known to have the greatest likelihood of bending, it is known to use cable bend limiters at those locations. Examples of such limiters are described in U.S. Pat. No. 5,449,206 to Lockwood for a BALL AND SOCKET JOINT WITH INTERNAL STOP; U.S. Pat. No. 6,039,081 to Albert for ARTICULATED BEND LIMITER; and U.S. Pat. No. 8,607,826 to Krohn, et al, for INTERLOCKING BEND LIMITER AND METHOD OF ASSEMBLY.

The factors associated with cable bend limiters generally include; the allowance of longitudinal extension or compression of the cable; the allowance of tortional rotation; the smoothness of continuous bending; limited constriction of the inner diameter of the bend limiter; adjustability of the minimum bend radius; ease of assembly and minimum parts count.

In view of the above discussion, it is beneficial to have a cable bend limiter that optimizes the different factors of bend limiter functionality.

SUMMARY OF THE INVENTION

One embodiment of the present invention provides a cable bend limiter, comprising: one or more joints each comprising an inner ball, an outer ball and one or two cylindrical sleeves; wherein the inner ball comprises two opposed truncated hemispheric sections with each truncated hemispheric section being coaxial to a respective first cable opening, each truncated hemispheric section having an attached cylindrical inner ball collar coaxial to and defining a respective first cable opening and extending from each respective truncated hemispheric section in an outward polar direction; wherein the outer ball comprises two interlocking outer ball sections, each outer ball section being coaxial to and defining a respective second cable opening, wherein the outer ball is sized for enclosing two opposed inner ball sections and allowing extension of a separate inner ball collar through the second cable opening of each interlocking outer ball section; wherein each sleeve of the one or two sleeves has a central axial opening axially attachable to a separate inner ball collar and coaxial with the first cable openings thereof, and each sleeve has one or two concave surfaces coaxial with the central opening and first cable opening of an attached inner ball section, each concave surface being sized for engaging an outer surface of an outer ball section when the contained inner ball section is attached to the sleeve; and wherein the respective first cable openings of two opposed inner ball sections contained within an outer ball can vary between axial alignment and a predetermined deviation from axial alignment in all radial directions.

The inner ball collars and the second cable openings of the outer ball sections may be sized to allow predetermined movement there-between when an inner ball collar is located within the second cable opening. The attachment of an inner ball collar to a sleeve may engage an outer ball section between an outer surface of a respective inner ball section and a concave surface of the sleeve.

The cable bend limiter may further comprise separate truncated hemispherical washers located between the inner ball section and a respective outer ball section and between the outer ball section and a respective concave surface of the sleeve. Each inner ball section may have a truncated hemispheric outer surface. Each outer ball section may include parallel inner and outer truncated hemispheric surfaces coaxial around the second cable opening.

Each sleeve concave surface may have the shape of a truncated hemisphere. The relative axial positioning between opposed inner ball truncated hemispheric sections may determine an allowable degree of bending for a cable located within the first cable openings. The relative axial positioning between an outer ball and an enclosed inner ball truncated hemispheric sections may be limited by the respective shapes of the inner ball collars and outer ball second cable openings. The interlocking outer ball sections may comprise respective engageable male and female threads for providing interlocking of the outer ball sections.

Another embodiment of the present invention provides a cable bend limiter, comprising: one or more, joints each comprising an inner ball, an outer ball, one or two cylindrical sleeves and first and second washers; wherein the inner ball comprises two opposed truncated hemispheric sections with each truncated hemispheric section being coaxial to a respective first cable opening, each truncated hemispheric section having an attached cylindrical inner ball collar coaxial to and defining a respective first cable opening and extending from each respective truncated hemispheric section in an outward polar direction; wherein the outer ball comprises two interlocking outer ball sections, each outer ball section being coaxial to and defining a respective second cable opening, wherein the outer ball is sized for enclosing two opposed inner ball sections and allowing extension of a separate inner ball collar through the second cable opening of each interlocking outer ball section; wherein each sleeve of the one or two sleeves has a central axial opening axially attachable to a separate inner ball collar and coaxial with the first cable openings thereof, and each sleeve has one or two concave surfaces coaxial with the central opening and first cable opening of an attached inner ball collar, each concave surface being sized for engaging an outer surface of an outer ball section when a contained inner ball section is attached to the sleeve; wherein a first washer is located between an inner ball section and a respective outer ball section; wherein a second washer is located between an outer ball section and a respective concave surface of a sleeve; and wherein the respective first cable openings of two opposed inner ball sections contained within an outer ball can vary between axial alignment and a predetermined deviation from axial alignment in all radial directions.

BRIEF DESCRIPTION OF THE DRAWINGS

The present invention is illustratively shown and described in reference to the accompanying drawings, in which:

FIG. 8 is a perspective sectional view of cable bend limiter of FIG. 7.

DETAILED DESCRIPTION OF THE DRAWINGS

The present invention is introduced using examples and particular embodiments for descriptive purposes. Although a variety of examples are presented to show how various configurations can be employed to achieve the desired improvements, these particular embodiments are only illustrative and not intended in any way to restrict the invention presented.

Figure 1:
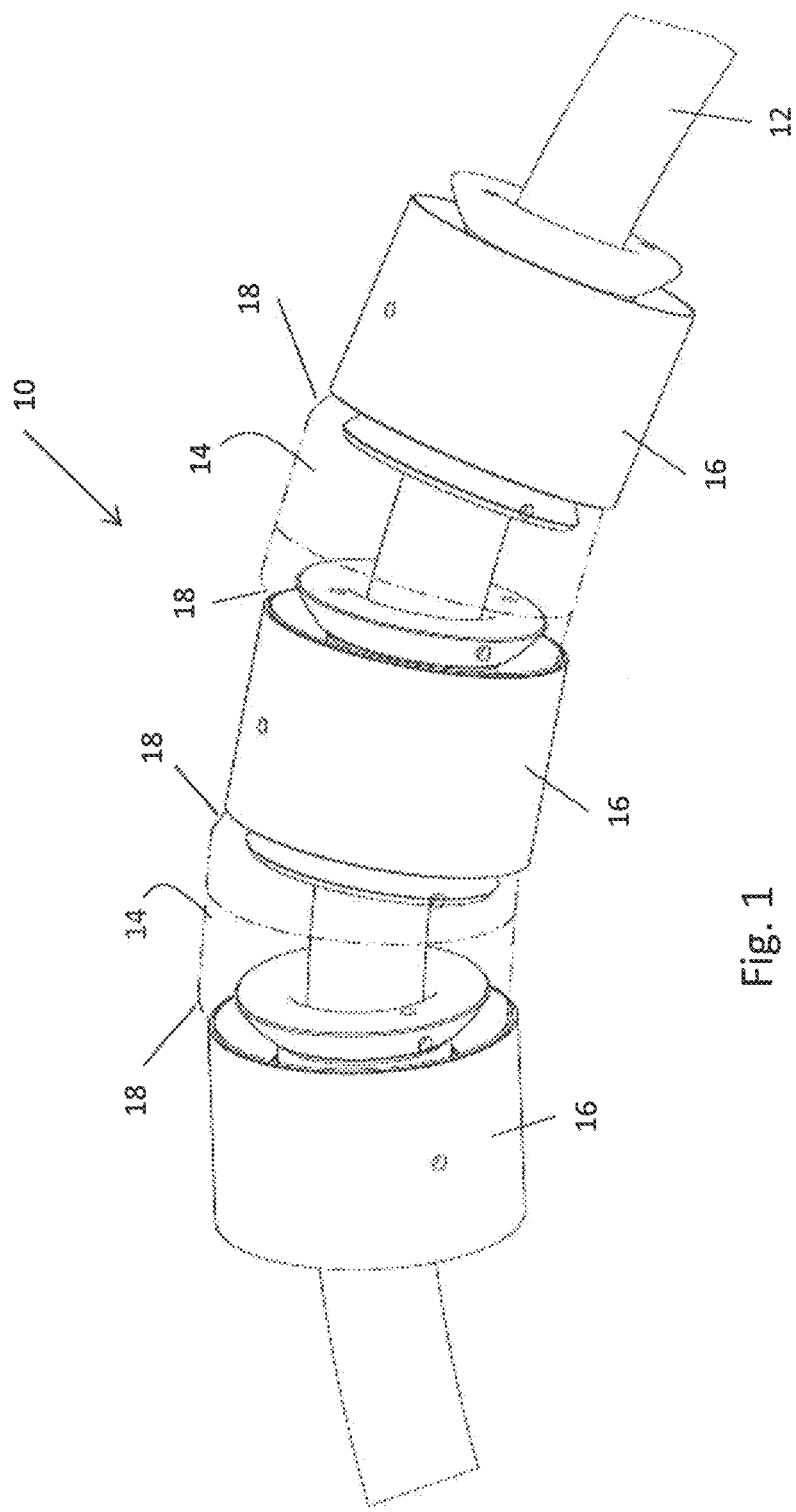
FIG. 1 is a perspective view of a cable bend limiter constructed in accordance with one embodiment of the present invention.

FIG. 1 is a perspective view of a cable bend limiter 10 located on and around a flexible cable 12. Cable bend limiter 10 is shown to include alternating outer ball sections 14 (in phantom) and sleeves 16. Limiter 10 and cable 12 are shown in a curved or bent position wherein outer ball sections 14 are displaced outwardly relative to the bend of cable 12 and sleeves 16, as shown at points 18.

Figure 2:
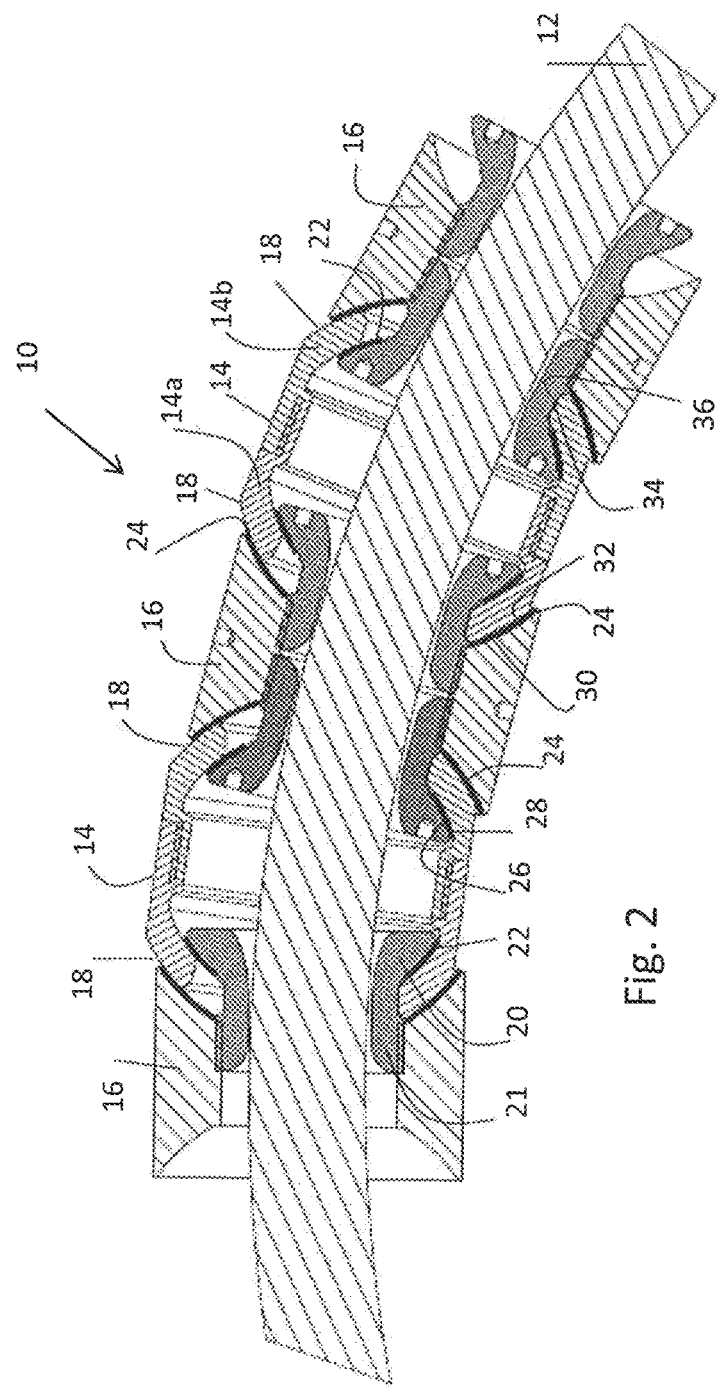
FIG. 2 is a side sectional view of a cable bend limiter constructed in accordance with the embodiment of FIG. 1.
Figure 3:
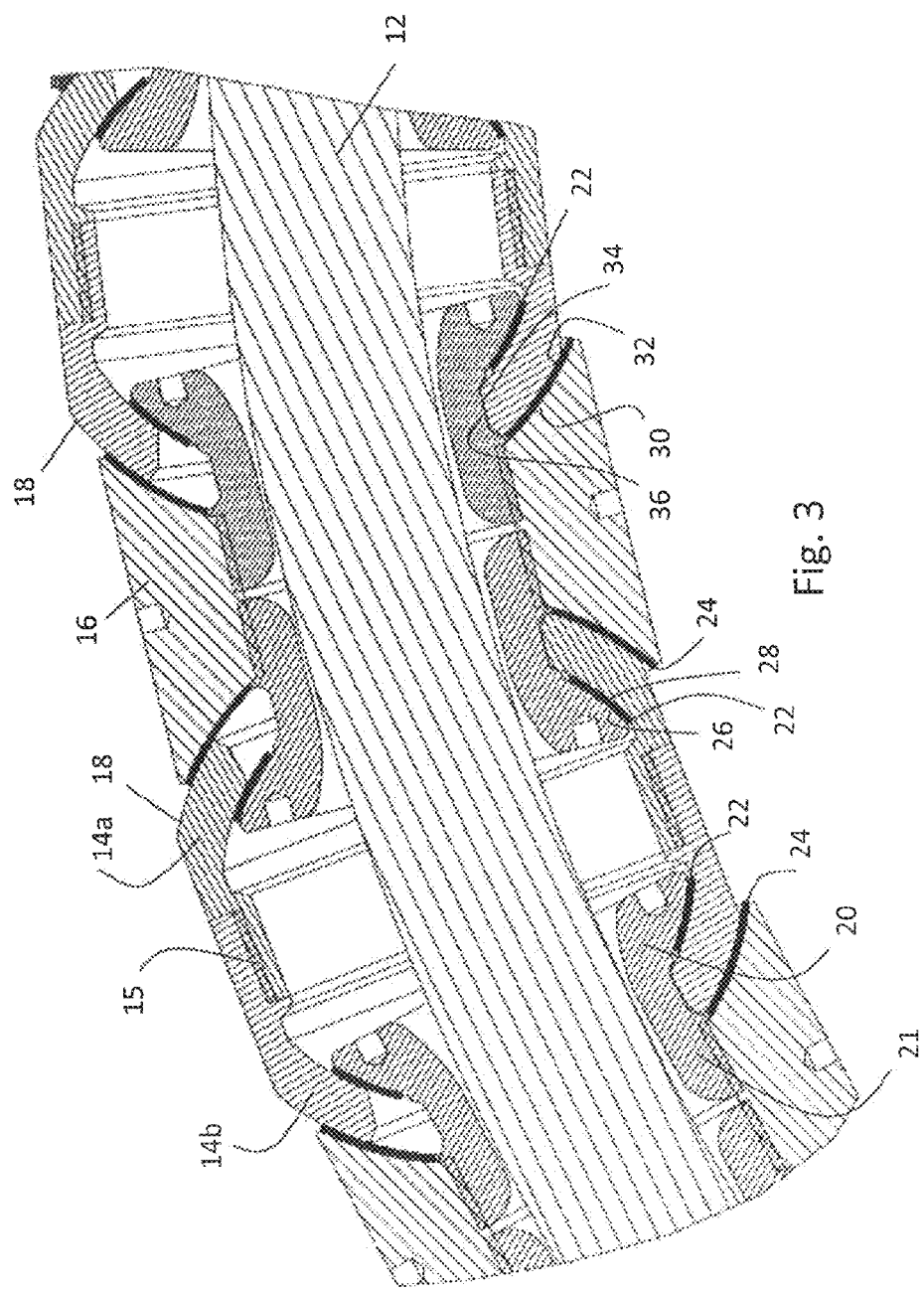
FIG. 3 is an enlargement of a portion of FIG. 2.

FIG. 2 is a side sectional view of cable bend limiter 10 taken along a central axis of cable 12. FIG. 3 is an enlarged view of a portion of FIG. 2 to show greater detail. In addition to outer balls 14 and sleeves 16, limiter 10 also includes inner ball sections 20 with attached collars 21 and annular truncated hemispherical washers 22, 24. Washers 22 are located between inner ball surface 26 and outer ball surface 28. Washers 24 are located between sleeve surfaces 30 and outer ball surfaces 32. Outer balls 14 are shown to include a pair of detachable interlocking sections 14a, 14b coupled by threaded portions 15.

With the construction shown in FIGS. 2 and 3, bending of limiter 10 causes relative rotation between outer balls 14 and respective enclosed inner ball sections 20 until an annular surface 34 of outer ball 14 impacts a matching annular surface 36 of inner ball collar 21.

Figure 4:
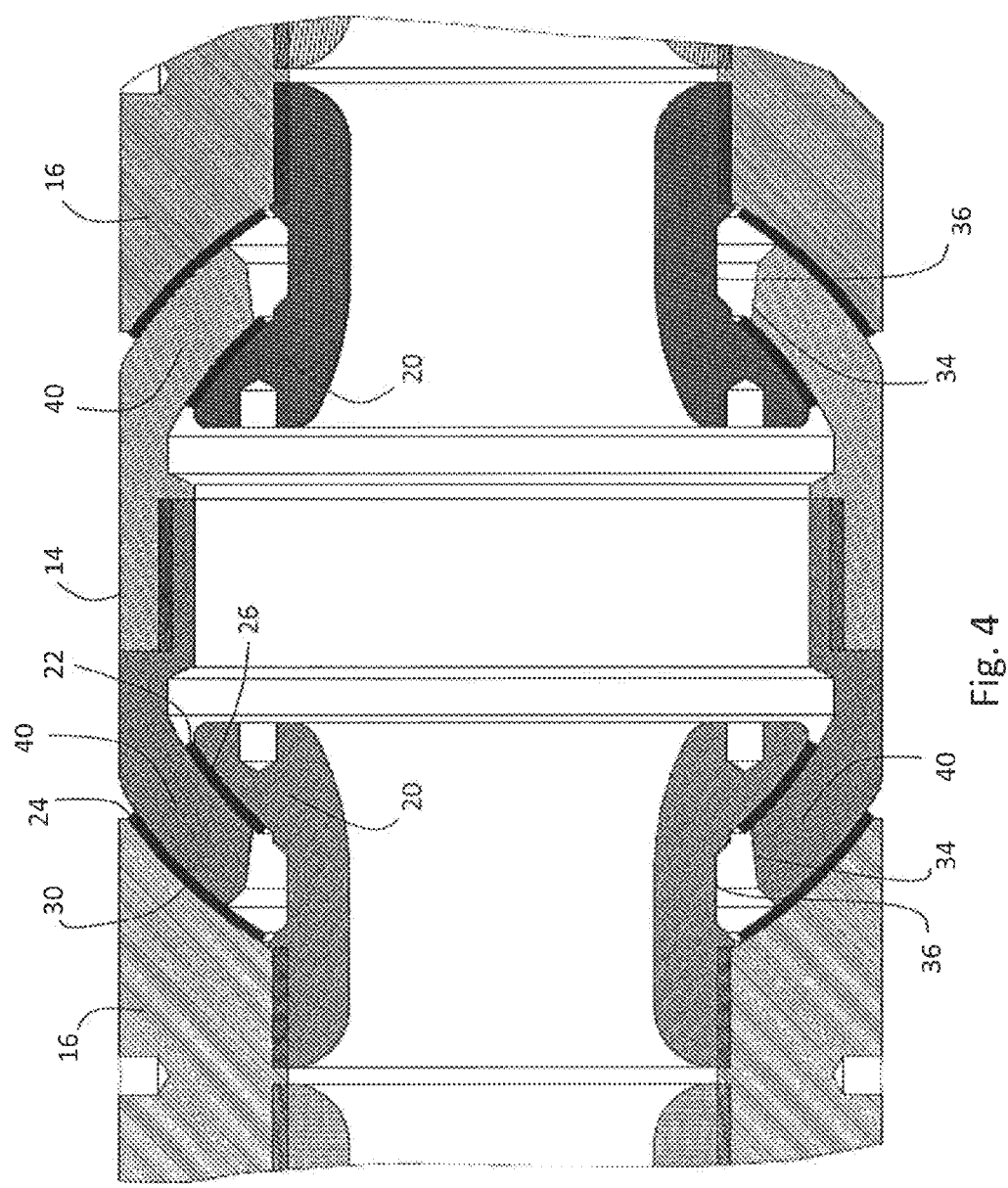
FIG. 4 is a side sectional view of a straight cable bend limiter constructed in accordance with the embodiment of FIG. 1.

FIG. 4 shows a side sectional view of a portion of cable bend limiter 10 in a straightened or aligned position and without a cable. In this straightened position the outer edges of outer balls 14 and sleeves 16 are in general alignment and annular surfaces 34 are not in contact with annular surfaces 36. Comparison between FIGS. 3 and 4 shows the relative movement between outer balls 14 and sleeves 16 caused by bending of cable bend limiter 10. Each of the outer balls 14 includes a pair of truncated hemispherical sections 40 which are held between concave surfaces 30 of sleeves 16 and convex truncated hemispherical surfaces 26 of inner ball sections 20. Truncated hemispherical washers 22 provide direct engagement between inner ball sections 20 and outer ball sections 40. Truncated spherical washers 24 provide engagement between outer ball sections 40 and sleeve 16. The only metal on metal contact occurs between annular surfaces 34 and 36 during bending of the cable as shown in FIG. 3. In this manner, any abrasive wear, galling, or high friction resistance to bending movement caused by metal-on-metal contact is prevented by washers 22 and 24, which have low friction surfaces. Thus, washers 22, 24 play an important role in providing functional performance to bend limiter 10. Any suitable material may be used for constructing washers 22, 24 depending upon the load requirements of the application. Such materials include nylon and TEFLON. in lighter load applications surface treatments of the interfacing surfaces might be sufficient to adequately reduce friction in lieu of using washers. The structural parts of bend limiter 10 may also be made of any suitable material depending upon the physical performance requirements of the application. Suitable materials include stainless steel, titanium, inconel or even aluminum.

Figure 5:
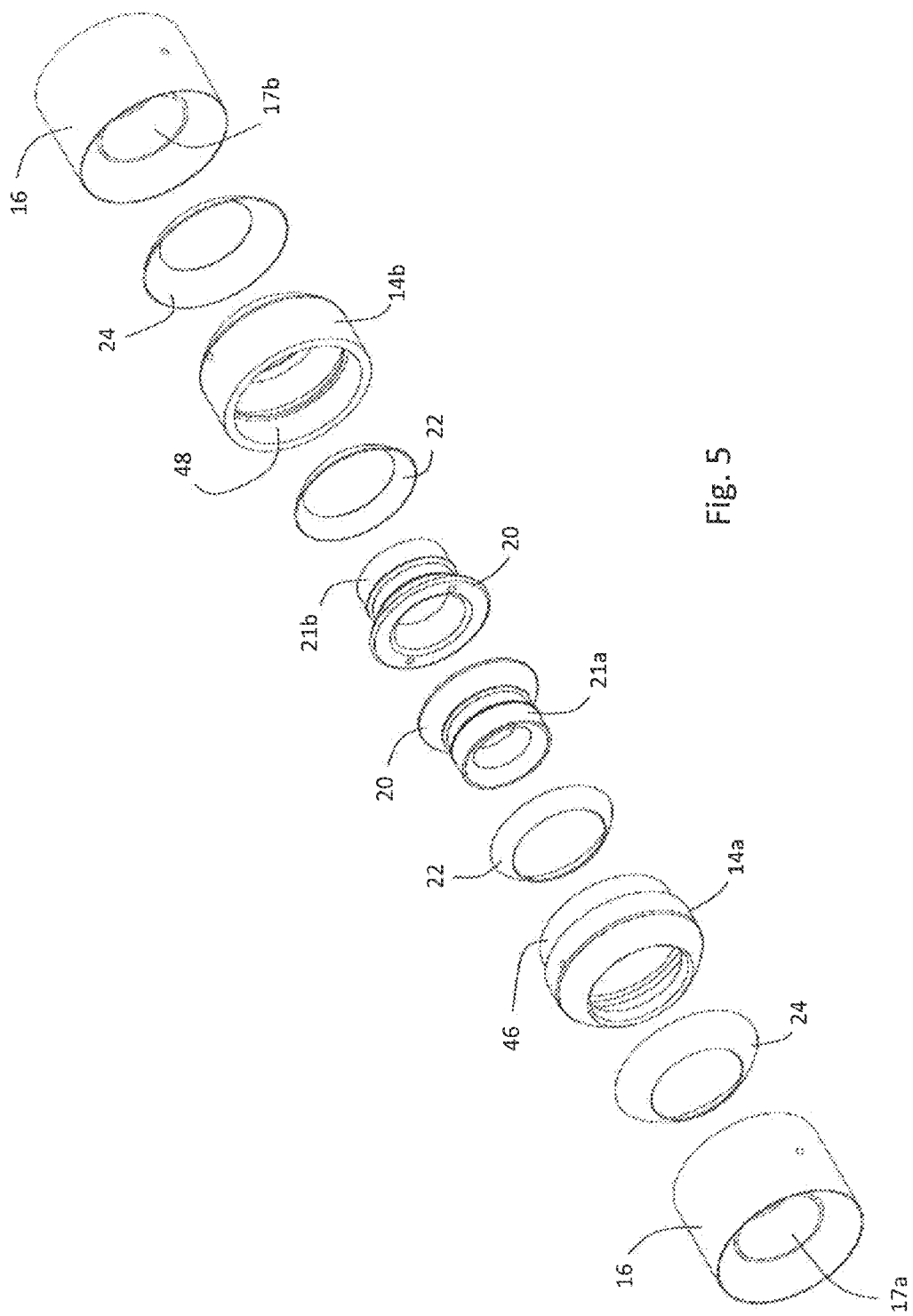
FIG. 5 is an exploded view the cable bend limiter of FIG. 1.

FIG. 5 shows an exploded view of cable bend limiter 10 as previously described. Assembly of cable bend limiter 10 includes the coaxial location of washer 22, outer ball section 14a and washer 24 on collar 21a and threaded engagement of collar 21a into a central opening 17a of a sleeve 16. Likewise, the assembly of outer ball section 14b includes the coaxial location of washer 22, outer ball section 14b and washer 24 on a collar 21b and threaded engagement of collar 21b with a central opening 17b of another sleeve 16. Final assembly is provided by engagement between a threaded male collar 46 of outer ball section 14a and a threaded female collar 48 of outer ball section 14b. By this method multiple outer balls 14 and sleeves 16 may be serially interconnected by inner ball sections 20 and collars 21.

Figure 6:
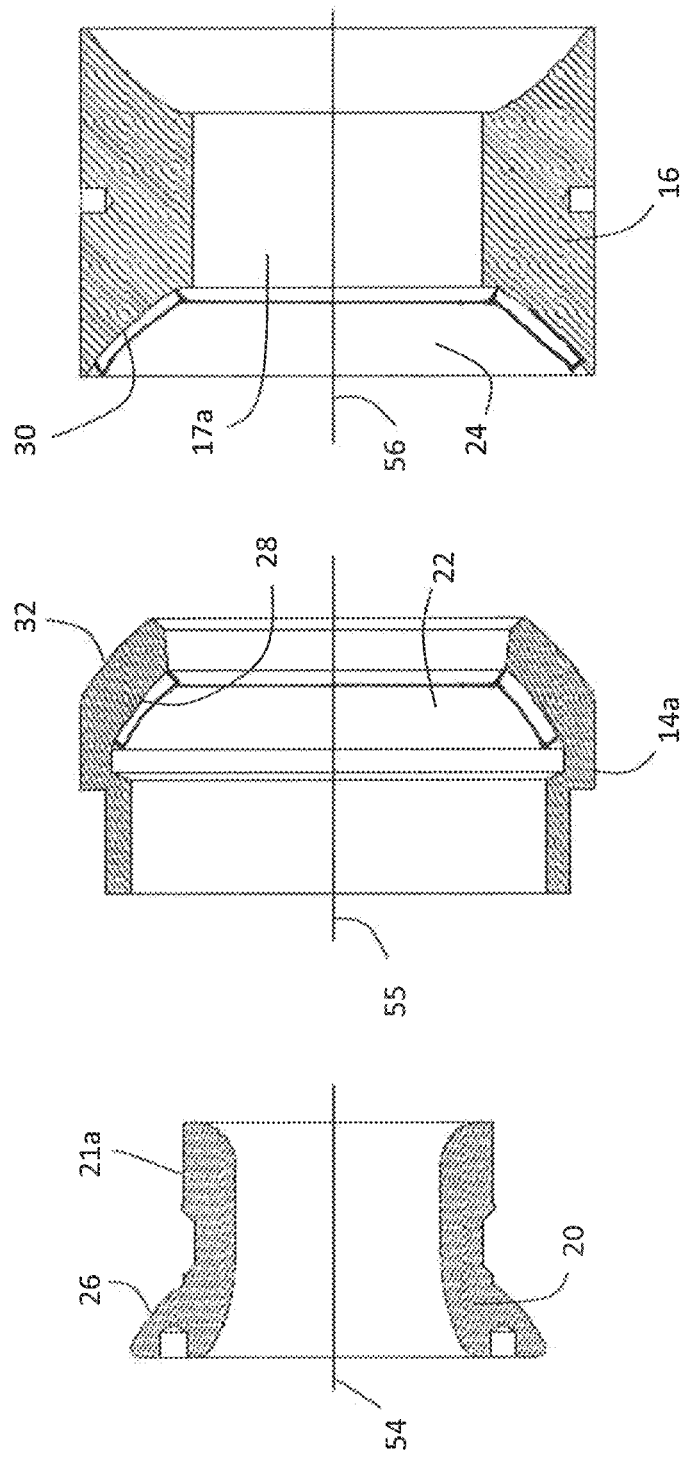
FIG. 6 is a side sectional view of select components of the cable bend limiter of FIGS. 1-5.

FIG. 6 shows cross sectional views of inner ball section 20, outer ball section 14a and sleeve 16 in alignment with their individual axes, 54, 55, 56, respectively. Outer ball section 14a and sleeve 16 include installed washers 22, 24, respectively. Threaded collar 21a engages a threaded inner surface 17a of sleeve 16, enclosing parallel truncated hemispheric inner and outer surfaces 28, 32 of outer ball section 14a between truncated hemispheric surface 26 with washer 22 and truncated hemispheric surface 30 with washer 24. Proper engagement is provided by sizing the radius of each respective truncated hemispheric surface 26-28 and 30-32 to allow for compressive engagement of truncated hemispheric washers 22, 24, respectively, there between. The threading of collar 21a into sleeve surface 17a means that the respective axes 54, 56 of inner ball section 20 and sleeve 16 always remain aligned. Relative bending takes place between outer ball section 14a and inner ball section 20, and through a coupled outer ball section 14b (FIG. 5) with a subsequently connected inner ball section. Thus, axis 55 may be aligned with axes 54 and 56 or it may vary a predetermined amount in any radial direction around axes 54 and 56. Useful amounts of angular deviation vary from 5 to 10 degrees, which will translate to an allowed cable bend radius of 10 to 20" or more.

Figure 7:
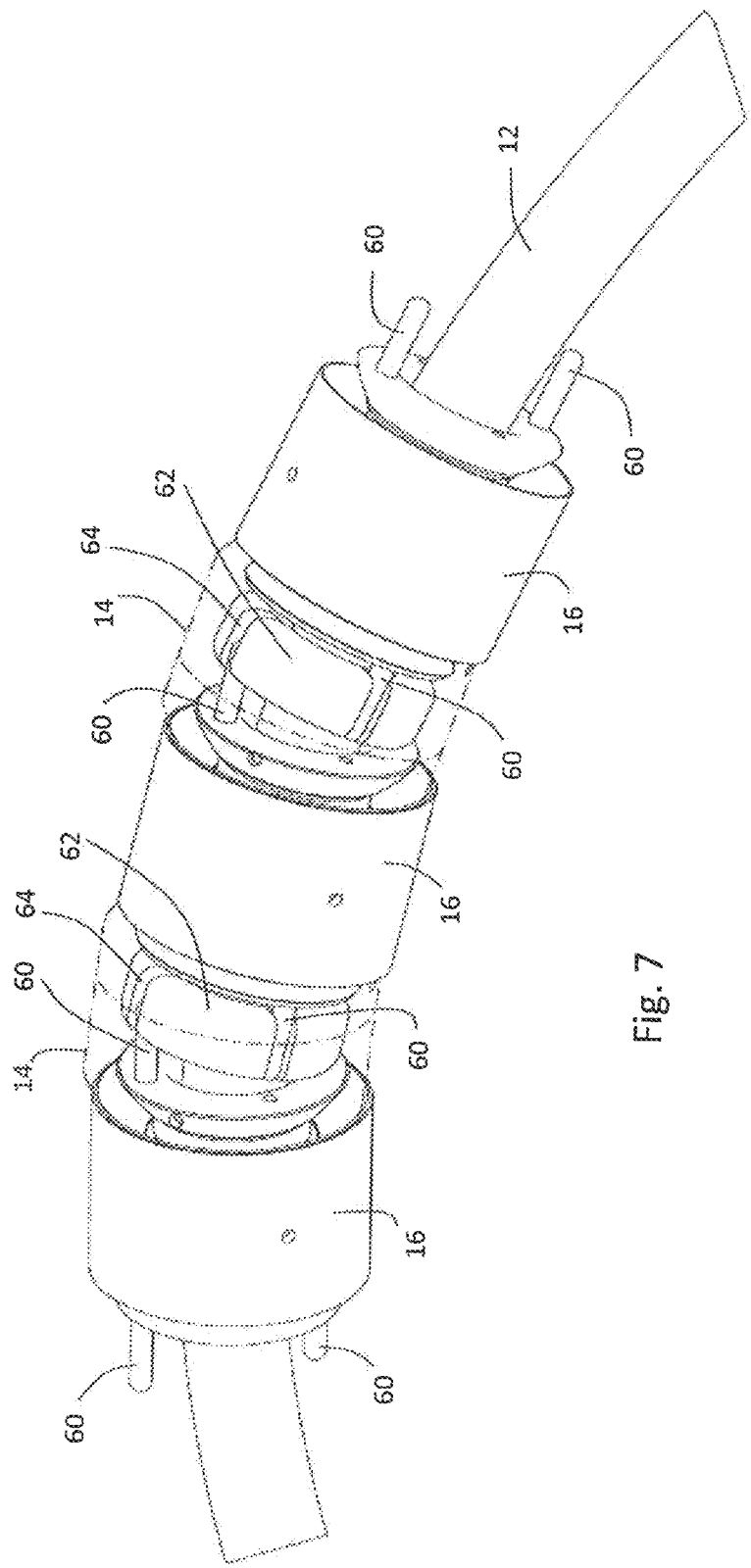
FIG. 7 is a perspective view of another cable bend limiter constructed in accordance with another embodiment of the present invention.

FIGS. 7 and 8 show a refinement of the present invention wherein hemispherical inner ball sections 20 include pairs of studs 60 extending therefrom and engaging with a nylon spacer or washer 62 located between opposing inner ball sections 20. Each inner ball section 20 includes two studs 60 on opposing sides of section 20. During assembly of outer ball sections 14a, 14b, washer 62 causes the studs 50 of opposing inner ball sections 20 to be orthogonally rotated with respect to each other as shown in FIG. 7. Studs 60 torsionally engage washer 62 by extending into openings 64 in washers 62, which openings 64 are parallel to the axis of washers 62 and have sufficient clearance to allow angular displacement of studs 60. This embodiment prevents the relative rotation between inner ball sections 20, which can be used to prevent cable 12 from twisting if the anchoring configuration of the bend limiter 10 necessitates it.

The cable bend limiter described above includes improved performance. Longitudinal extension or compression is not allowed. Torsional rotation can be allowed or not; smooth, low friction, continuous directional bending is provided. The inner diameter is not constricted by bending. The minimum bend radius is adjustable via a single or combination of simple dimensional changes. A simple assembly process is provided which has a minimum parts count that can be cascaded to any arch length. A relatively small assembly diameter provides a high structural safety factor.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. A cable bend limiter, comprising:
   one or more joints each comprising an inner ball, an outer ball, one or two cylindrical sleeves and first and second washers;
   wherein the inner ball comprises two opposed truncated hemispheric sections with each truncated hemispheric section being coaxial to a respective first cable opening, each truncated hemispheric section having an attached cylindrical inner ball collar coaxial to and defining a respective first cable opening and extending from each respective truncated hemispheric section in an outward polar direction;
   wherein the outer ball comprises two interlocking outer ball sections, each outer ball section being coaxial to and defining a respective second cable opening, wherein the outer ball is sized for enclosing two opposed inner ball sections and allowing extension of a separate inner ball collar through the second cable opening of each interlocking outer ball section;
   wherein each sleeve of the one or two sleeves has a central axial opening axially attachable to a separate inner ball collar and coaxial with the first cable openings thereof, and each sleeve has one or two concave surfaces coaxial with the central opening and first cable opening of an attached inner ball collar, each concave surface being sized for engaging an outer surface of an outer ball section when a contained inner ball section is attached to the sleeve;
   wherein a first washer is located between an inner ball section and a respective outer ball section;
   wherein a second washer is located between an outer ball section and a respective concave surface of a sleeve; and
   wherein the respective first cable openings of two opposed inner ball sections contained within an outer ball can vary between axial alignment and a predetermined deviation from axial alignment in all radial directions.

2. A cable bend limiter, comprising:
   one or more joints each comprising an inner ball, an outer ball and one or two cylindrical sleeves;
   wherein the inner ball comprises two opposed truncated hemispheric sections with each truncated hemispheric section being coaxial to a respective first cable opening, each truncated hemispheric section having an attached cylindrical inner ball collar coaxial to and defining a respective first cable opening and extending from each respective truncated hemispheric section in an outward polar direction;
   wherein the outer ball comprises two interlocking outer ball sections, each outer ball section being coaxial to and defining a respective second cable opening, wherein the outer ball is sized for enclosing two opposed inner ball sections and allowing extension of a separate inner ball collar through the second cable opening of each interlocking outer ball section;
   wherein each sleeve of the one or two sleeves has a central axial opening axially attachable to a separate inner ball collar and coaxial with the first cable openings thereof, and each sleeve has one or two concave surfaces coaxial with the central opening and first cable opening of an attached inner ball collar, each concave surface being sized for engaging an outer surface of an outer ball section when a contained inner ball section is attached to the sleeve; and
   wherein the respective first cable openings of two opposed inner ball sections contained within an outer ball can vary between axial alignment and a predetermined deviation from axial alignment in all radial directions.

3. The cable bend limiter of claim 2, wherein the inner ball collars and the second cable openings of the outer ball sections are sized to allow predetermined movement therebetween when an inner ball collar is located within the second cable opening.

4. The cable bend limiter of claim 2, wherein attachment of an inner ball collar to a sleeve engages an outer ball section between an outer surface of a respective inner ball section and a concave surface of the sleeve.

5. The cable bend limiter of claim 2, further comprising separate truncated hemispherical washers located between an inner ball section and a respective outer ball section and between an outer ball section and a respective concave surface of a sleeve.

6. The cable bend limiter of claim 5, wherein each inner ball section has a truncated hemispheric outer surface.

7. The cable bend limiter of claim 5, wherein each outer ball section includes parallel inner and outer truncated hemispheric surfaces coaxial around the second cable opening.

8. The cable bend limiter of claim 5, wherein each sleeve concave surface has the shape of a truncated hemisphere.

9. The cable bend limiter of claim 2, wherein relative axial positioning between opposed inner ball truncated hemispheric sections determines an allowable degree of bending for a cable located within respective first cable openings.

10. The cable bend limiter of claim 9, wherein the relative axial positioning between an outer ball and an enclosed inner ball truncated hemispheric sections is limited by the respective sizes of the inner ball collars and outer ball second cable openings.

11. The cable bend limiter of claim 2, wherein the interlocking outer ball sections comprise respective engageable male and female threads for providing interlocking of the outer ball sections.

12. The cable bend limiter of claim 2, further comprising one or more members extending from the truncated hemispheric sections of each inner ball and towards an opposing truncated hemispheric section, and a toroidal spacer located between opposing truncated hemispheric sections and having parallel openings adapted for torsional engagement of extending members from opposing truncated hemispheric sections and thereby preventing relative rotation between opposing truncated hemispheric sections.

13. The cable bend limiter of claim 12, wherein the one or more members comprise a pair of members affixed to opposing edges of each truncated hemispheric section.

14. The cable bend limiter of claim 13, wherein the pair of members from opposing truncated hemispheric sections pass through different openings located orthogonally around the toroidal spacer.

15. The cable bend limiter of claim 2, wherein the axial openings of the one or two sleeves is axially attachable to a pair of opposed inner ball collars.

* * * * *